(12) United States Patent
Kawakami

(10) Patent No.: US 7,867,528 B2
(45) Date of Patent: Jan. 11, 2011

(54) METHOD FOR PRODUCING BREAD

(75) Inventor: Yoichi Kawakami, Osaka (JP)

(73) Assignee: Kobeya Baking Co., Ltd., Osaka (JP)

( * ) Notice: Subject to any disclaimer, the term of this patent is extended or adjusted under 35 U.S.C. 154(b) by 461 days.

(21) Appl. No.: 11/703,750

(22) Filed: Feb. 8, 2007

(65) Prior Publication Data

US 2007/0190206 A1  Aug. 16, 2007

(30) Foreign Application Priority Data

Feb. 15, 2006 (JP) .............................. 2006-038208

(51) Int. Cl.
A21D 2/00 (2006.01)
A23L 1/28 (2006.01)
A47J 39/00 (2006.01)

(52) U.S. Cl. ........................ 426/18; 426/19; 426/496; 426/520

(58) Field of Classification Search .................... 426/18, 426/19, 496
See application file for complete search history.

(56) References Cited

U.S. PATENT DOCUMENTS

| 4,456,625 | A | * | 6/1984 | Durst ........................ 426/106 |
| 4,788,067 | A | * | 11/1988 | Seneau ........................ 426/19 |
| 5,262,182 | A | * | 11/1993 | Kasahara et al. .............. 426/19 |
| 2001/0051202 | A1 | | 12/2001 | Hofer |
| 2005/0163885 | A1 | | 7/2005 | Rees |
| 2006/0127553 | A1 | | 6/2006 | van der Meer et al. |

FOREIGN PATENT DOCUMENTS

| DE | 852 231 C | 1/1953 |
| EP | 1 614 354 A | 11/2006 |
| FR | 2 687 544 A | 8/1993 |
| FR | 1 463 008 A | 6/1996 |
| JP | 49-14650 | 2/1974 |
| JP | 55-156545 | 12/1980 |
| JP | 11-155470 | 6/1999 |
| JP | 2002-186409 | 7/2002 |
| JP | 2003-116453 A | 4/2003 |
| JP | 2005-110698 | 4/2005 |
| JP | 2005-245210 | 9/2005 |
| UA | 52 975 C2 | 1/2003 |
| WO | 03/086083 A | 10/2003 |
| WO | 2004/066751 A1 | 8/2004 |

OTHER PUBLICATIONS

JP 2002-186409 Machine Translation.*
JP 2003-116453 Machine Translation.*
Notice of Reasons for Rejection issued Jan. 19, 2010 in corresponding Japanese patent application 2006-038208 (with partial English translation).

* cited by examiner

*Primary Examiner*—Timothy M Speer
*Assistant Examiner*—Felicia C King
(74) *Attorney, Agent, or Firm*—Wenderoth, Lind & Ponack, L.L.P.

(57) ABSTRACT

In a method of producing bread which includes the steps of mixing separate leaven or yeast into bread dough, fermenting the dough, dividing and forming the dough, fermenting the dough again, and baking the thus fermented dough, the baking step includes at least one baking stage and at least in the final stage of baking, the dough is baked using superheated steam. The dough may be first baked partially, and after storing at room temperature or freezing, the dough may be completely baked. There is also provided a method of producing raisin yeast bread which includes the steps of fermenting water extracts of raisins and flour, further fermenting the mixture for 10 to 20 days while adding flour and water to obtain ripe raisin leaven, mixing the ripe leaven into separate leaven or bread dough, fermenting the mixture, dividing and forming the mixture, fermenting the thus divided and formed dough first at 20-25° C. for 0.5 to 2 hours, then at a low temperature of 2-10° C. for 7 to 22 hours, and finally at 20-25° C. for 1 to 6 hours, and baking the thus fermented dough. At least in the final stage of baking step, the dough is baked using superheated steam.

1 Claim, 3 Drawing Sheets

Fig. 1

(a) Raisin yeast for 14 days | Fermentation for about 3 hours | Dividing and forming | Final fermentation for about 12~16 hours | Baking (b) Panetone for about 6 days | Fermentation for about 3 hours | Dividing and forming | Final fermentation for about 3~4 hours | Baking (c) Fermenting separate leaven for about 4 hours ← Mixing | Floor | Dividing and forming | Final fermentation for about 1 hour | Baking
← Mixing

METHOD FOR PRODUCING BREAD

BACKGROUND OF THE INVENTION

This invention relates to a method for producing bread, particularly to a method comprising improved baking steps, and more specifically to a method for producing bread using e.g. raisin leaven and a method of producing partially baked and frozen bread.

Bread fresh from the oven is usually excellent in flavor, aroma and taste and is liked by consumers. Trials are therefore being made to improve production, storage and distribution techniques to offer bread that is similar in condition to "fresh-from-the-oven" bread in hotels, restaurants, bakeries and other retailers.

In view of the recent trend toward natural foods, bread produced using various natural yeasts has been developed. For example, bread produced using apples and grapes (including raisins) to which wild yeasts are adhered is now well-known (as disclosed in JP patent publication 2002-186409A).

According to the fermentation steps, methods for producing bread are classified into straight (direct kneading) methods and methods in which separate leaven is fermented together with a portion of bread dough and mixed with the remaining material.

Bread produced by the former methods is superior in flavor. But because the latter methods are suitable for mass production, methods are known in which separate leaven is fermented for a prolonged period of time at low temperature. It is particularly known to initially ferment separate leaven for a long period of time, i.e. 10 to 20 hours at a low temperature of about 0 to 15° C. and at a finishing stage, the leaven is fermented at 13 to 28° C. for 5 to 15 hours (see JP patent publication 2005-110698A).

But even if the leaven is fermented for a long period of time at low temperature, it is difficult to sufficiently improve the flavor and taste of the entire dough. It is especially difficult to impart ripe flavor to the entire dough at the final fermentation step after the entire material is added and formed.

It is even more difficult to sufficiently improve the taste of bread that has been fermented after forming, and baked. It was especially difficult to produce raisin yeast bread, which is fermented using raisin leaven, which has well ripe deep flavor such that it sufficiently reveals its peculiar aroma, flavor and taste.

For various other methods for producing bread, too, it is not easy to bake dough in the final baking step such that it has its surface suitably dried so that it is crispy on the surface and aromatic, and still soft inside with flavor, aroma and a suitable amount of moisture trapped inside. A technique is especially desired for baking bread such that it can be reliably maintained in such condition after being partially baked and stored at normal temperature or frozen while being distributed.

SUMMARY OF THE INVENTION

An object of the present invention is to provide a method for producing bread such that it has its surface suitably dried so that it is crispy on the surface and aromatic, and still soft inside with flavor, aroma and suitable moisture trapped inside.

Another object of the invention is to provide a method of producing raisin yeast bread which sufficiently reveals its unique flavor (aroma and taste), and a method of producing frozen raisin yeast bread as an intermediate product which reliably reveals its unique flavor.

According to the present invention, there is provided a method of producing bread comprising mixing separate leaven containing yeast, or yeast into bread dough, fermenting the bread dough, dividing the bread dough into a plurality of dough pieces, forming the respective dough pieces, fermenting the formed dough pieces, and baking, in one or a plurality of stages, the thus formed and fermented dough pieces, wherein at least the baking in the final stage is carried out using superheated steam.

The baking step preferably comprises a plurality of stages with the baking in the final stage carried out using superheated steam, the bread obtained is crispy on the surface and aromatic, and still soft inside with flavor, aroma and suitable moisture trapped inside. Between the two stages of baking, the partially baked bread may be frozen.

Superheated steam used in the final baking stage is produced by further heating steam produced at 100° C. at the atmospheric pressure to about 100 to 350° C. using a known mechanism and is brought into contact with the dough pieces.

Baking using such superheated steam is carried out e.g. in a known superheated steam oven. Heating using superheated steam is lower in scale loss, i.e. lower in reduction of the water content, than heating using radiant heat produced by electric or gas energy. In fact, the water content sometimes even increases when heated using superheated steam. Heating using superheated steam thus suppresses evaporation of water in bread dough, and also heats its surface to such an extent as not to be carbonized, which is not desirable for the bread dough.

If the baking step is carried out in a plurality of stages, it may comprise partially baking the formed and fermented dough pieces by direct or indirect dry heating, and finish-baking the partially baked dough pieces using superheated steam.

Dry heating may be direct heating by infrared rays from a heat source such as an electric oven or a gas oven, or indirect heating by contact with any of a metallic material such as an iron plate, a stone and a ceramic material that are heated by infrared rays.

In any of these heating methods, the bread dough is partially baked to 80 to 90% such that its surface or surface region is dry. Then, the dough is cooled down to normal temperature or frozen to trap moisture and flavor in the dough. The dough can thus be stored in this state. Then, immediately before being served or sold, the bread dough is baked using superheated steam. The thus baked bread has a suitably dry and crispy surface region, and is still soft inside with flavor, aroma and suitable amount of moisture trapped inside.

The method is especially suitable for producing raisin yeast bread. Preferably, the method for producing raisin yeast bread comprises producing a ripe raisin leaven by fermenting a water extract of raisins and flour, mixing the ripe raisin leaven into leaven or bread dough to let the mixture ferment, dividing the thus fermented mixture into a plurality of dough pieces, forming the divided dough pieces, fermenting the thus formed dough pieces at a low temperature for a long period of time, and baking, in one or a plurality of stages, the thus formed and fermented dough pieces, wherein at least the baking in the final stage is carried out using superheated steam.

The ripe raisin leaven produced by fermenting a water extract of raisins in this method contains, besides wild yeasts, naturally occurring lactobacilli, acetic acid bacteria and other unspecified bacteria.

The ripe raisin leaven is mixed into separate leaven or bread dough, fermented, and the mixture is divided into a plurality of dough pieces, formed and fermented again at a low temperature for a long period of time. With this arrangement, the dough ripens due to hydration and enzyme actions. The bread dough thus formed is high in water content with excellent flavor (taste and aroma).

The thus fermented bread dough is baked in one or a plurality of stages with at least the final stage of baking carried out using superheated steam. Heating using superheated steam suppresses evaporation of water in bread dough, and also its surface is browned to such an extent as not to be carbonized. The thus formed raisin bread has a sufficient flavor (aroma and taste) peculiar to ripe raisin leaven.

In order to reliably age the raisin leaven, the raisin leaven is preferably obtained by fermenting a mixture of a water extract of raisins and flour, and further fermenting the mixture for 10 to 20 days while adding flour and water to the mixture, thereby producing raisin yeast bread having a flavor (aroma and taste) peculiar to ripe raisin leaven.

In order to reliably obtain such raisin yeast bread, the fermentation after forming preferably comprises an initial stage of fermentation which is carried out at 20 to 25° C. for 0.5 to 2 hours, an intermediate stage of low-temperature fermentation which is carried out at 2 to 10° C. for 7 to 22 hours, and a final stage of fermentation which is carried out at 20 to 25° C. for 1 to 6 hours.

By carrying out the initial stage of fermentation, the intermediate stage of low-temperature fermentation and the final stage of fermentation at the above-described predetermined temperatures for the above-described predetermined periods of time, raisin yeast bread having a flavor (aroma and taste) peculiar to raisin leaven is reliably obtained.

The baking step may be carried out in two or more stages. The bread dough may be frozen between any two baking stages.

Specifically, the baking step may comprise incompletely partially baking the formed and fermented dough pieces, and completely rebaking the dough pieces after the partially baked dough pieces have been stored at room temperature or frozen.

Also, an intermediate product of raisin yeast bread may be produced by the abovementioned method. More specifically, the present invention provides a method for producing frozen raisin yeast bread comprising producing a ripe raisin leaven by fermenting a water extract of raisins and flour, mixing the ripe raisin leaven into separate leaven or bread dough to let the mixture ferment, dividing the thus fermented mixture into a plurality of dough pieces, forming the divided dough pieces, fermenting the thus formed dough pieces at a low temperature for a long period of time, incompletely baking the fermented dough pieces, and freezing the thus baked dough pieces.

The frozen intermediate product of raisin yeast bread is obtained by intentionally incompletely (i.e. partially) baking bread dough, and normally includes about 10 to 20% of an unbaked portion. This partially baked bread dough is rebaked in the final step. Thus, fresh-from-the-oven bread is easily obtained in a short period of time and it is recommended to do so just before serving to consumers.

The method of producing bread according to the present invention includes one or more baking steps, and at least the final baking step is carried out using superheated steam. It is thus possible to produce bread having its surface suitably dried so that it is crispy on the surface and aromatic, and still soft inside with flavor, aroma and suitable moisture trapped inside.

In the method which comprises the steps of partially baking bread dough and baking the thus partially baked bread dough using superheated steam, it is possible to bake bread dough such that it has its surface suitably dried so that it is crispy on the surface and aromatic, and still soft inside with flavor, aroma and suitable moisture trapped inside. Such partially baked bread can be easily transported and stored, and can be quickly rebaked, so that high-quality, fresh-from-the-oven bread can be served to consumers.

According to the method for producing raisin yeast bread comprising mixing the ripe raisin leaven into leaven or bread dough, fermenting the mixture, dividing the thus fermented bread dough into a plurality of pieces, forming and fermenting the divided dough pieces, and baking the thus divided, formed and fermented bread dough using superheated steam, it is possible to trap flavor and aroma peculiar to raisin yeast bread. Also, because such bread requires relatively high water content, the raisin yeast bread produced by this method always has a flavor (aroma and taste) peculiar to this type of bread, unlike bread of this type produced by dry baking. It is also possible to produce frozen raisin yeast bread as an intermediate product of the raisin yeast bread.

BRIEF DESCRIPTION OF THE DRAWINGS

Other features and objects of the invention will become apparent from the following description made with reference to the accompanying drawings, in which:

FIGS. 1A, 1B and 1C show steps of various methods for producing bread;

DETAILED DESCRIPTION OF THE PREFERRED EMBODIMENTS

The method of producing bread according to the first embodiment of the invention comprises mixing separate leaven containing yeast, or yeast into bread dough, fermenting the bread dough, dividing the bread dough into a plurality of dough pieces, forming the respective dough pieces, fermenting the formed dough pieces, and baking, in one or a plurality of stages, the thus formed and fermented dough pieces, wherein at least the baking in the final stage is carried out using superheated steam.

The yeast used in this embodiment is not limited and may be any ordinary yeast including baker's yeasts and wild yeasts.

If a baker's yeast is used, it may be any unicellular microorganism which can decompose sugars into alcohol and carbonic acid gas, such as *Saccharomyces cerevisiae*. Such yeasts may be used as wild yeasts in which a plurality of kinds of naturally occurring microorganisms are present. Instead, a yeast that has been industrially purified into a single or predetermined species may be used.

Wild yeasts are those attached to fruits such as grapes, grains and vegetables. A plurality of such yeasts and aroma from vegetables and fruits impart peculiar flavor and taste to the bread.

The method for producing bread using wild or purified yeast according to the present invention may be a straight method (direct kneading method) or an separate leaven method as shown in FIG. 1C. The steps of fermenting the dough, dividing and forming the dough and fermenting the dough again may be the steps of an ordinary known method of producing bread.

If the bread dough is baked in a plurality of stages, except at the final stage of baking, the dough may be baked by known direct or indirect dry heating. Direct heating, which is also called direct firing, is a heating method in which the bread dough is directly heated using radiant heat from a heat source such as an electric heater or combustion gas in an ordinary electric oven or gas oven.

Indirect heating is a method in which bread dough is heated using a cooking device including an element to be heated such as an iron or ceramic plate, or a stone material which is disposed between the bread dough and a heat source and which can efficiently radiate infrared rays. If a ceramic material is used, the dough can be heated by heat radiation containing infrared rays.

If the bread dough is baked by dry heating and by superheated steam as finish baking, after partially baking the bread dough, the dough may be stored at normal temperature or in a frozen state as an intermediate product which can be stored or transported.

In the finish baking step using superheated steam in a superheated steam generator for cooking (made e.g. by SUN-PLANT Co., Ltd.), superheated steam produced by heating steam produced at 100° C. under atmospheric pressure to about 100-350° C. may be used to heat the dough.

Figure 2:
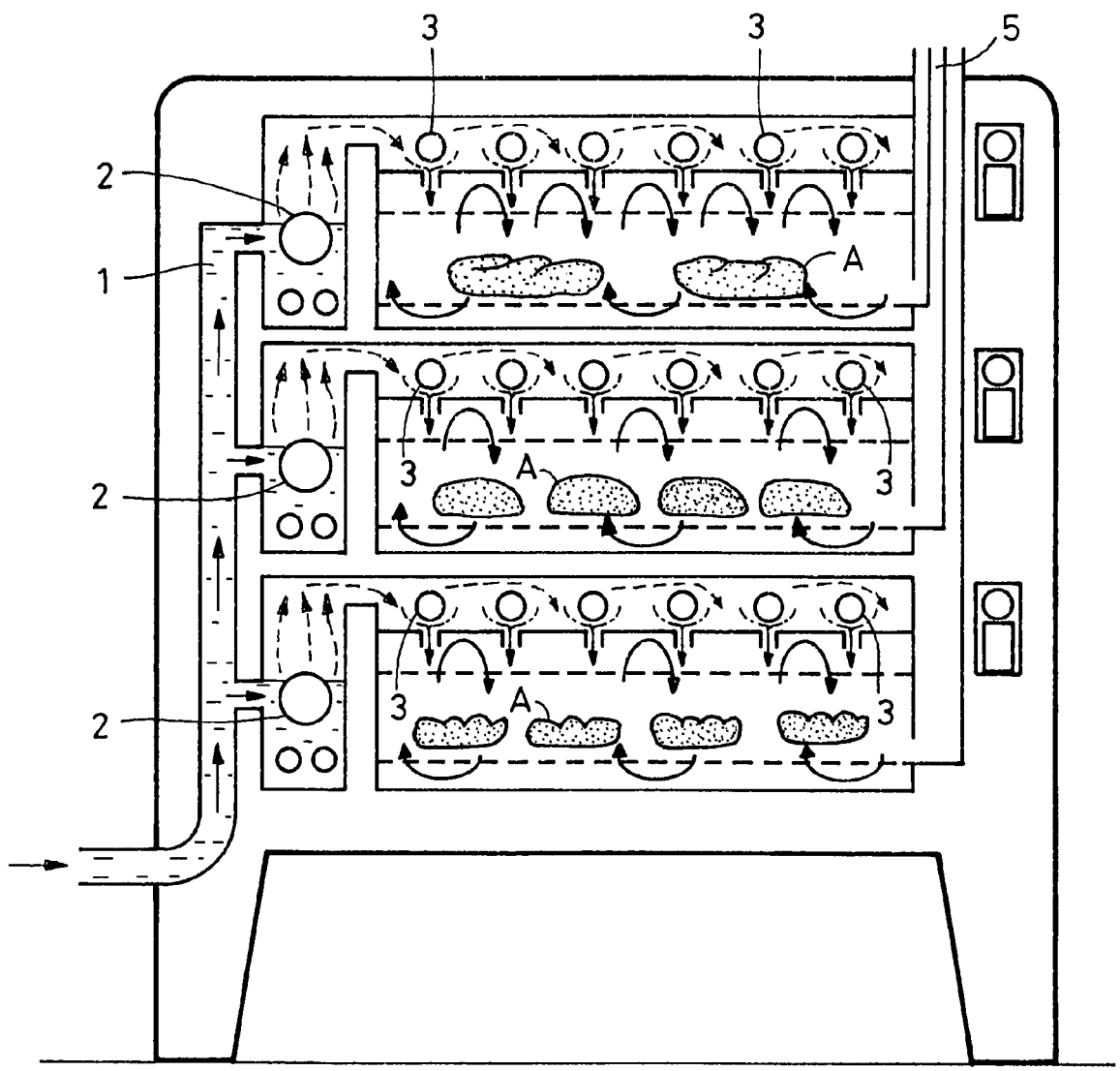
FIG. 2 is a front view of an oven for baking bread using superheated steam.
Figure 3:
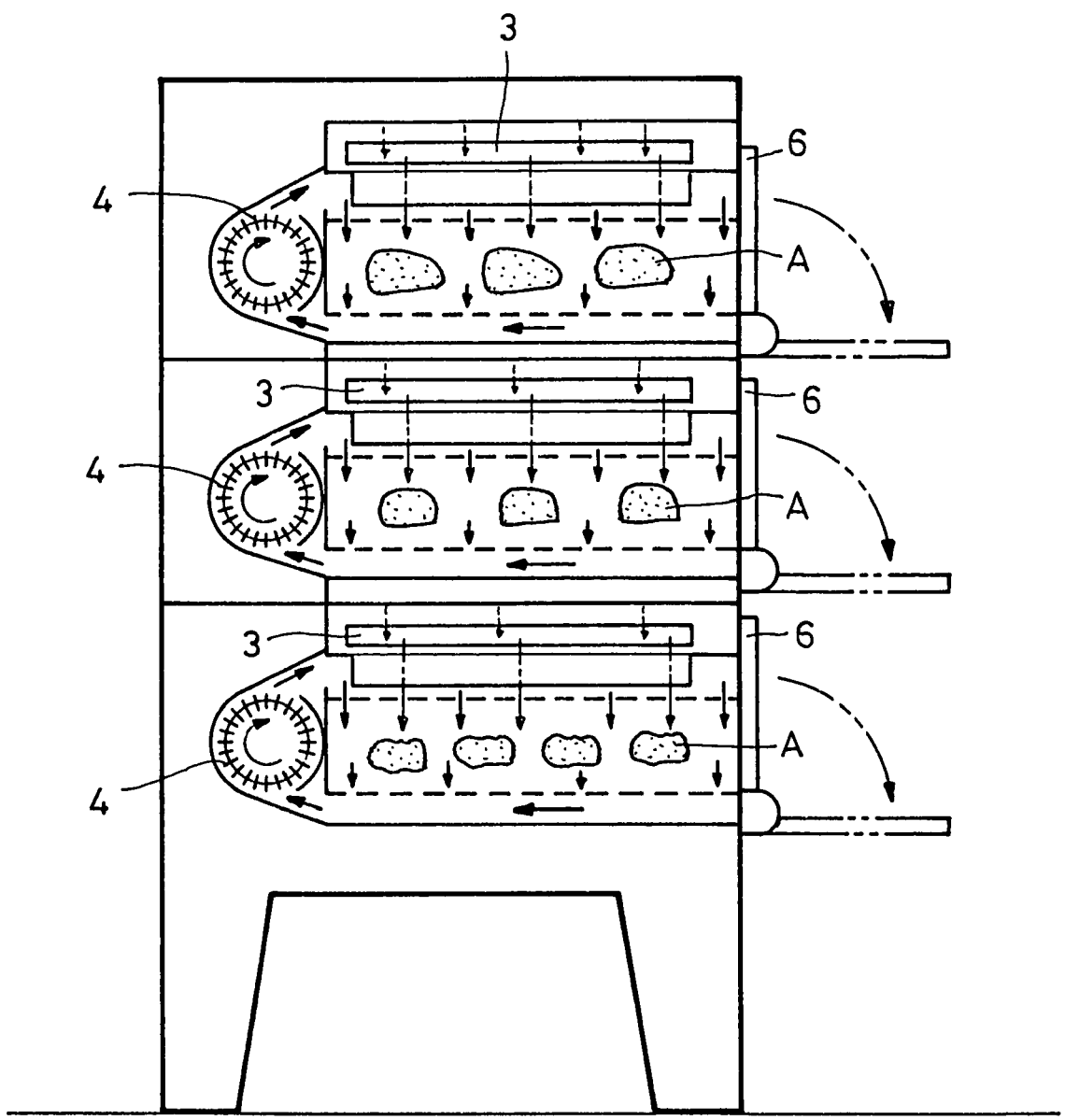
FIG. 3 is a side view of the oven of FIG. 2.

FIGS. 2 and 3 show a superheated steam generator for cooking, which has a plurality of baking chambers disposed one over another. Clean water is supplied from an external water tank (not shown) through a conduit 1 into the respective baking chambers and heated and evaporated by electric heaters 2 in the respective baking chambers into saturated steam of about 100° C. The saturated steam is then further heated by separate heaters 3 provided at upper portions of the baking chambers to about 120-300° C. as superheated steam, which is injected downwardly into the baking chambers through their ceilings.

After heat exchange with the bread dough A to be baked by contact with the dough, the superheated steam is drawn, together with an air flow, into the space under the floors of the baking chambers through holes formed in the floors. The air flow is generated by heat-resistant sirocco circulation fans 4 provided behind the baking chambers. The superheated steam is thus circulated in the generator by the air flow. While being circulated, the superheated steam is reheated by the heaters 3 and injected downwardly into the respective baking chambers through the ceilings, thus efficiently baking the dough.

The temperatures of the heaters 2 and 3 and the amount of air flow generated by the heat-resistant circulation fans 4 are controlled by a computer. Thus, superheated steam is circulated automatically at a predetermined temperature. Its circulation rate is also controllable by inverters of the motors for rotating the fans 4. Water smoke produced from the bread dough A after heat exchange is expelled through exhaust ducts 5. The baking chambers are accessible through front doors 6.

When the dough is heated using superheated steam, evaporation of water (drying) equivalent to the amount of convection electric heat occurs as in the case of heating by air. But in the initial stage of heating with superheated steam, the water content of the dough apparently increases because the amount of condensed water is greater than the amount of evaporated water. But the large amount of condensation heat of the superheated steam rapidly increases the surface temperature of the dough. While water exists in the dough, its temperature remains at 100° C. But as the dough dries, thermal denaturation occurs.

When water on the surface of the dough disappears, due to oxygen in the dough, the dough is oxidized and decomposed. The temperature of the dough thus increases to the temperature of superheated steam, which is higher than 100° C., thus causing "browning" of the dough. It is therefore necessary to suitably control the heating time.

The method of producing raisin bread according to the second embodiment is described in detail with reference to FIG. 1A, which schematically shows the steps of this method. For comparison, FIG. 1B shows the steps of the method for producing Panetone.

The ripe raisin leaven used in this invention is produced by naturally fermenting a mixture of water, raisins and flour to form a liquid mixture, and further fermenting and aging the liquid mixture. The raisin leaven thus formed contains various unspecified bacteria such as yeasts, lactic acid bacteria and acetic acid bacteria. It is considered that these bacteria derives peculiar deep flavor of the bread, taking a long time.

Raisin leaven can be extracted in the form of a liquid mixture by a known method. For example, such a liquid mixture is produced by putting oil-coating-free, high-quality raisins in a boiled bottle together with water, sealing it, and fermenting the mixture for about 5 days while degassing every day without adding water until the contents of the raisins dissolve into water, thus coloring the water dark brown and giving strong sweet smells.

During aging of the raisin leaven, which is the initial step of the method shown in FIG. 1A, water extracts of raisins and flour are fermented and the mixture is further fermented at low temperature for a long period of time, i.e. about 10 to 20 days while adding flour and water to produce the raisin leaven.

In order to obtain such rape raisin leaven, 90 to 110 parts by weight (hereinafter simply referred to as "parts" instead of "parts by weight") of water and 50 to 70 parts of flour are mixed into 50 parts of raisin leaven to obtain leaven a on day 1, leaven a is stored for 2 days at 21 to 24° C., 15 to 35 parts of water and 11 to 14 parts of flour are mixed into leaven a to obtain leaven b on day 4, and leaven b is stored at 21 to 24° C. for 5 days.

Then, from day 10 to day 14, 35 to 55 parts of water and 20 to 40 parts of flour are mixed into leaven b on day 9, the mixture is stored for 4 to 6 hours to obtain leaven A, 40 to 60 parts of water and 24 to 44 parts of flour are mixed into 100 parts leaven A, the mixture is stored for 4 to 6 hours to obtain leaven B. Further, 45 to 65 parts of water and 27 to 47 parts of flour are mixed into 100 parts of leaven B, and the mixture is stored for 8 to 12 hours to obtain leaven C. By repeating this cycle of growing leavens A to C 5 times or more, usable ripe raisin leaven is obtained on day 15 or later.

As shown in FIG. 1A, according to the present invention, the thus obtained raisin leaven is mixed into separate leaven or bread dough, fermented, divided and formed. These steps may be conventional known steps for producing bread.

According to the present invention, the thus formed bread dough is fermented at a low temperature for a long period of time to obtain bread dough that has been sufficiently matured by the hydration and enzymatic action, and is high in water content.

Preferably, the low-temperature, long-time fermentation step comprises initial fermentation at 20 to 25° C. for 0.5 to 2 hours, low-temperature fermentation at 2 to 10° C. for 7 to 22 hours, and final fermentation at 20 to 25° C. for 1 to 6 hours.

By initially fermenting dough at a relatively high temperature, the entire dough is fermented to a necessary level. Then, the dough is fermented at a low temperature for a relatively long period of time while controlling its temperature so as to slow down the fermenting speed.

During the low-temperature fermentation, it is considered that while the activity of yeast slows down at a slow pace, flavor, aroma and taste of bread dough are slowly derived to a maximum degree.

In the final fermentation, the fermenting temperature is raised only for a short period of time to sufficiently ferment the dough as a finishing step. The low-temperature, long-time fermentation step thus completes. By carrying out this step, it is possible to derive complex flavor (aroma and taste) from the bread dough which is impossible with short-time fermentation.

After this step, the bread dough is baked to a necessary extent. In the baking step, the bread dough may be completely baked at one time using superheated steam. But for convenience of transportation, the baking step may be divided into two parts, i.e. partial baking, and rebaking, after freezing, to complete bread.

Bread that has been frozen after partial baking may be distributed or stored as an intermediate product.

Partial baking of bread dough may be carried out by an ordinary baking method not using superheated steam. For example, the bread dough may be partially baked in an ordinary dry heating oven such as an electric oven.

Then, the finish baking step using superheated steam is carried out in the manner as described with reference to the first embodiment. For this step, a superheated steam generator for cooking (such as one made by SUNPLANT Co., Ltd.) may be used. In this step, bread dough is baked using superheated steam produced by further heating steam produced at 100° C. to about 100 to 350° C.

Heating using superheated steam is an extremely advantageous way of baking raisin yeast bread dough that is high in water content. As will be apparent from the below-described experiment results, compared to radiant heat produced by electric or gas energy, heating using superheated steam is low in scale loss, so that the reduction of water content is low. The water content sometimes even increases by heating with superheated steam. Heating using superheated steam thus suppresses evaporation of water in bread dough, and also heats its surface to such an extent as to be suitably browned without carbonization and without oxidation of the dough. The raisin yeast bread thus formed is sufficient in flavor (aroma and taste) peculiar to ripe raisin leaven. The amount of superheated steam per unit volume of air may be suitably adjusted.

If the dough is partially baked, the dough is baked to about 80 to 90% of the entire dough. Then, the dough is quickly frozen and stored. For example, the dough is quickly frozen to an extremely low temperature of e.g. −18 to −20° C. so that it can be stored or distributed for a long period of time.

When the dough is completely baked (rebaked) in the final stage of baking, the frozen dough is baked at a temperature of 180 to 250° C. according to the size and kind of the dough for a relatively short period of time, i.e. about 3 to 15 minutes, using superheated steam. The thus baked dough is taken out of the oven and cooled naturally. During cooling, heating continues to a certain extent in the bread.

Example 1 to 4 of the Invention

Bread doughs having the compositions shown in Table 1 were prepared by a straight method using yeast according to the method of the first embodiment. The doughs were fermented, divided, formed and fermented following ordinary bread making steps under the conditions shown in Table 2.

TABLE 1

| Material | Content (parts by weight) |
| --- | --- |
| Flour | 100.0 |
| Yeast | 1.8 |
| Malt | 0.3 |
| Salt | 2.0 |
| Fat | 2.0 |
| Sucrose | 1.0 |
| Water | 67.0 |

TABLE 2

| Steps | Conditions |
| --- | --- |
| Mixing | 6 min. at low speed |
|  | 2 min. at high speed |
| Kneading | 24° C. |
| Fermenting | 2 hours at 28° C. with humidity 75%, 1 hour after degassing |
| Dividing | 350 g |
| Bench time | 25 min. |
| Forming | 550 mm |
| Fermenting | 70 min. at 33° C. with humidity 75% |
| Before baking | Cuts are formed on surface |
| Baking | 33 min. at 240° C. with steam (Partial baking: 30 min.) |

Then, for Reference Examples 1 and 2, the doughs were completely baked in an ordinary electric oven. The doughs of Examples 1 and 2 of the invention were partially baked (by about 80%). The doughs of Example 1 of the invention and Reference Example 1 were then frozen for 72 hours. The doughs of Example 2 of the invention and Reference Example 2 were stored at normal temperature for 24 hours. All the doughs were then baked as a final step at 180° C. for 7 minutes in a superheated steam oven.

The weights (g) and amounts (%) of evaporation of the bread products obtained were measured, which are shown in Table 3. Further, a flavor and taste test was conducted according to the standards of "French bread" of Japan Institute of Baking Technology. Their flavor, aroma and taste thus measured are indicated by points (15 points is the full mark for each item) in Table 3.

TABLE 3

| No. of Examples of the invention and Comparative Examples | | Rebaking conditions | | | |
|---|---|---|---|---|---|
| | | Examples of the invention (superheated steam oven) 7 min. at 180° C. Weight of product (g) and amount of evaporation (%) | | Comparative Examples ordinary bakery oven) 7 min. at 180° C. Weight of product (g) and amount of evaporation (%) | |
| 1 (complete baking and freezing) | Before rebaking | 266.30 | — | 257.10 | — |
| | Immediately after rebaking | 266.10 | ▲0.2 g | 252.50 | ▲4.6 g |
| | 10 min. after rebaking | 264.70 | ▲1.6 g | 251.10 | ▲6.0 g |
| | 60 min. after rebaking | 263.50 | ▲2.8 g ▲1.1% | 248.90 | ▲8.2 g ▲3.2% |
| | Aroma (15 points) | 13 | Skin is crispy with good | 12 | Skin is hard and the |
| | Flavor (15 points) | 13 | flavor and aroma and | 12 | entire bread is slightly |
| | Taste (15 points) | 13 | not too dry. | 12 | too hard when eaten |
| | Total (45 points) | 39 | | 36 | though flavor and aroma are good. |
| | Evaluation | Δ Reference Example 1 | | Δ X Comparative Example 1 | |
| 2 (partial baking and freezing) | Before rebaking | 265.00 | — | 260.30 | — |
| | Immediately after rebaking | 264.90 | ▲0.1 g | 257.50 | ▲2.8 g |
| | 10 min. after rebaking | 264.30 | ▲0.7 g | 256.10 | ▲4.2 g |
| | 60 min. after rebaking | 263.10 | ▲1.9 g ▲0.7% | 254.60 | ▲5.7 g ▲2.2% |
| | Aroma (15 points) | 14 | Skin is crispy with good | 13 | Skin is too dry and the |
| | Flavor (15 points) | 14 | flavor and aroma and | 12 | entire bread is too dry |
| | Taste (15 points) | 14 | not too dry. | 12 | though flavor and |
| | Total (45 points) | 42 | | 37 | aroma are good. |
| | Evaluation | ○ Example 1 of the invention | | Δ Comparative Example 2 | |
| 3 (complete baking and storage at normal temperature) | Before rebaking | 263.30 | — | 262.50 | — |
| | Immediately after rebaking | 260.60 | ▲2.7 g | 258.00 | ▲4.5 g |
| | 10 min. after rebaking | 259.90 | ▲3.4 g | 254.70 | ▲7.8 g |
| | 60 min. after rebaking | 257.90 | ▲5.4 g ▲2.1% | 253.50 | ▲9.0 g ▲3.4% |
| | Aroma (15 points) | 14 | Skin is crispy but the | 13 | Skin is crispy but the |
| | Flavor (15 points) | 13 | entire bread is slightly | 13 | entire bread is too dry |
| | Taste (15 points) | 13 | too dry when eaten | 12 | when eaten and flavor |
| | Total (45 points) | 40 | though flavor and aroma are good | 38 | and aroma are weak. |
| | Evaluation | ○ Reference Example 2 | | Δ Comparative Example 3 | |
| 4 (partial baking and storage at normal temperature) | Before rebaking | 270.00 | — | 262.70 | — |
| | Immediately after rebaking | 269.70 | ▲0.3 g | 258.50 | ▲4.2 g |
| | 10 min. after rebaking | 268.50 | ▲1.5 g | 255.60 | ▲7.1 g |
| | 60 min. after rebaking | 267.00 | ▲3.0 g ▲1.1% | 254.20 | ▲8.5 g ▲3.2% |
| | Aroma (15 points) | 14 | Skin is crispy and | 13 | Skin is crispy but flavor |
| | Flavor (15 points) | 13 | flavor are good, but | 13 | and aroma are slightly |
| | Taste (15 points) | 14 | aroma are slightly too | 13 | too weak and the entire |
| | Total (45 points) | 41 | weak and the entire bread is slightly too dry when eaten. | 39 | bread is slightly too dry when eaten. |
| | Evaluation | ○ Example 2 of the invention | | Δ Comparative Example 4 | |

Comparative Examples 1 to 4

Except that an ordinary bakery oven (electric oven) was used instead of a superheated steam oven in the final stage of baking, bread was produced in exactly the same manner as in Examples 1 and 2 of the invention and Reference Examples 1 and 2, respectively.

The weights (g) and amounts (%) of evaporation of the bread products obtained were measured, which are shown in Table 3. Further, a flavor and taste test was conducted according to the standards of "French bread" of Japan Institute of Baking Technology. Their flavor, aroma and taste thus measured are indicated by points (15 points is the full mark for each item) in Table 3.

As is apparent from the results shown in Table 3, by rebaking dough using superheated steam, irrespective of whether the dough is completely baked or partially baked or is frozen or stored at normal temperature after baking, the thus produced bread is suitably dry and crispy on the surface and flavor, aroma and water are trapped inside.

For frozen raisin yeast bread produced by the method of the second embodiment, too, after partial baking, dough was frozen and rebaked using superheated steam.

Example 3 of the Invention

To 1 kg of flour, 21 g of salt, 10 g of fat, 10 g of sucrose, 560 g of water and about 250 g of ripe raisin yeast on day 15 which was obtained by the method of the invention were added, the mixture was fermented at 28° C. for 4 hours, the mixture was divided into a plurality of pieces each weighing 100 g, the divided pieces were formed into the shape of rod-shaped French bread (casse-croûte), and fermented at a low temperature for a long period of time. That is, the divided pieces were initially fermented at 21 to 24° C. for one hour, then at a lower temperature of 5 to 6° C. for 10 hours, and finally at 21 to 24° C. for 3 hours.

The bread dough was then partially baked by about 80% at 230° C. for 18 minutes in an ordinary bakery oven, naturally cooled, and frozen at −20° C. for 72 hours. The frozen dough was then thawed by leaving it at room temperature for one hour, rebaked at 210 or 250° C. as shown in Table 1, and stored at room temperature for a predetermined time period.

For the thus rebaked raisin yeast bread, a flavor and taste test was conducted according to the standards of "French bread" of Japan Institute of Baking Technology to evaluate its flavor, aroma and taste by points (15 points is the full mark for each item).

Comparative Example 5

Except that dough was rebaked in an ordinary bakery oven (electric oven), raisin yeast bread was produced in exactly the same manner as in Example 3 of the invention. For the thus rebaked raisin yeast bread, a flavor and taste test as described above was conducted. The results of the test are shown in Table 4.

TABLE 4

| | | Heating conditions and weights of products | | | |
|---|---|---|---|---|---|
| | | 5 min. at 210° C. Weight of product (g) and amount of evaporation (%) | | 3 min. at 250° C. Weight of product (g) and amount of evaporation (%) | |
| Example No. | | | | | |
| Example 3 of the invention with superheated steam | Before rebaking | 78.05 | | 80.95 | |
| | Immediately after rebaking | 76.50 | −1.99% | 79.65 | −1.61% |
| | 5 min. after rebaking | 75.85 | | 79.15 | |
| | 20 min. after rebaking | 75.50 | −3.27% | 78.80 | −2.66% |
| | Flavor Aroma (15 points) | 12 | Relatively weak | 12 | Relatively weak |
| | and Flavor (15 points) | 14 | Relatively weak | 14 | Relatively weak |
| | taste Taste (15 points) | 12 | Crispy | 12 | Crispy |
| | test Total (45 points) | 38 | Good | 38 | Good |
| Comparative Example 5 without superheated steam | Before rebaking | 78.30 | | 80.20 | |
| | Immediately after rebaking | 76.05 | −2.87 | 78.50 | −2.12 |
| | 5 min. after rebaking | 75.55 | | 78.05 | |
| | 20 min. after rebaking | 75.25 | −3.90 | 77.70 | −3.12 |
| | Flavor Aroma (15 points) | 8 | Weak | 8 | Weak |
| | and Flavor (15 points) | 8 | Weak | 8 | Weak |
| | taste Taste (15 points) | 8 | Dry | 10 | Dry |
| | test Total (45 points) | 24 | Aroma and flavor are weak | 26 | Aroma and flavor are weak |

As will be apparent from the test results shown in Table 4, it was discovered that raisin yeast bread rebaked using superheated steam of 210 to 250° C. had sufficient flavor, aroma and taste peculiar to raisin yeast.

What is claimed is:

1. A method of producing bread comprising:
   mixing separate leaven containing yeast, or yeast into bread dough,
   fermenting the bread dough,
   dividing the bread dough into a plurality of dough pieces,
   forming the respective dough pieces,
   fermenting the formed dough pieces, and
   baking, in one or a plurality of stages, the thus formed and fermented dough pieces,
   wherein said baking step comprises partially baking the formed and fermented dough pieces by direct or indirect dry heating, freezing the partially baked dough, and finish-baking the partially baked dough after freezing, wherein said finish-baking is carried out using superheated steam of 180 to 250° C. for 3 to 15 minutes,
   wherein said leaven containing yeast is a ripe raisin leaven obtained by fermenting a mixture of a water extract of raisins and flour to ripe,
   wherein the ripe raisin leaven is obtained by fermenting a mixture of a water extract of raisins and flour, and further fermenting the mixture for 10 to 20 days while adding flour and water to the mixture, and wherein the fermentation after forming comprises an initial stage of fermentation which is carried out at 20 to 25° C. for 0.5 to 2 hours, an intermediate stage of low-temperature fermentation which is carried out at 2 to 10° C. for 7 to 22 hours, and a final stage of fermentation which is carried out at 20 to 25° C. for 1 to 6 hours.

* * * * *